US009183636B1

(12) United States Patent
Collet et al.

(10) Patent No.: US 9,183,636 B1
(45) Date of Patent: Nov. 10, 2015

(54) LINE SEGMENTATION METHOD (71) Applicants: Frederic Collet, Etterbeek (BE); Jordi Hautot, Neupre (BE); Michel Dauw, Machelen (BE); Pierre De Muelenaere, Court-Saint-Etienne (BE); Olivier Dupont, Sombreffe (BE); Gunter Hensges, Wurselen (DE)

(72) Inventors: Frederic Collet, Etterbeek (BE); Jordi Hautot, Neupre (BE); Michel Dauw, Machelen (BE); Pierre De Muelenaere, Court-Saint-Etienne (BE); Olivier Dupont, Sombreffe (BE); Gunter Hensges, Wurselen (DE)

(73) Assignee: I.R.I.S., Mont-Saint-Giubert (BE)

( * ) Notice: Subject to any disclaimer, the term of this patent is extended or adjusted under 35 U.S.C. 154(b) by 22 days.

(21) Appl. No.: 14/254,096

(22) Filed: Apr. 16, 2014

(51) Int. Cl.
*G06K 9/34* (2006.01)
*G06T 7/00* (2006.01)

(52) U.S. Cl.
CPC ..... *G06T 7/0079* (2013.01); *G06T 2207/30176* (2013.01)

(58) Field of Classification Search
None
See application file for complete search history.

(56) References Cited

U.S. PATENT DOCUMENTS

| 5,060,277 | A | * | 10/1991 | Bokser | 382/160 |
| 5,228,095 | A | * | 7/1993 | Abe | 382/174 |
| 6,041,141 | A | * | 3/2000 | Yamamoto et al. | 382/231 |
| 6,519,363 | B1 | * | 2/2003 | Su et al. | 382/177 |
| 2006/0230004 | A1 | * | 10/2006 | Handley | 706/12 |
| 2007/0172137 | A1 | * | 7/2007 | Mori | 382/239 |
| 2008/0013831 | A1 | * | 1/2008 | Aoki | 382/176 |
| 2011/0243444 | A1 | * | 10/2011 | Mitic | 382/176 |
| 2012/0250989 | A1 | * | 10/2012 | Asano | 382/165 |
| 2013/0129216 | A1 | * | 5/2013 | Tsai et al. | 382/170 |
| 2014/0257789 | A1 | * | 9/2014 | Zaric et al. | 704/8 |
| 2014/0355896 | A1 | * | 12/2014 | Osada | 382/229 |

* cited by examiner

*Primary Examiner* — Sean Motsinger
(74) *Attorney, Agent, or Firm* — Jerold I. Schneider; Schneider Rothman Intellectual Property Law Group PLLC (57) ABSTRACT

A line segmentation method which starts with determining a first starting point coordinate and generating a list of potential character widths dependent on a maximum character width stored in a database and on characteristics of the portion of the line of text corresponding to the maximum character width. The method determines a second portion of the line of text corresponding to the first starting point coordinate and the first width on the list of potential character widths. On the second portion, a classification method is applied providing a likelihood of error for the first width and a candidate character. The likelihood of error is compared with a first threshold determined by a trade-off between speed and accuracy, and if the likelihood of error corresponding to the first width is lower than the threshold value, the candidate character is selected as the character meaning that a segment is known.

14 Claims, 4 Drawing Sheets

LINE SEGMENTATION METHOD

TECHNICAL FIELD

The present invention relates to a line segmentation method and more particularly to a line segmentation method used within an OCR system.

BACKGROUND ART

Figure 1:
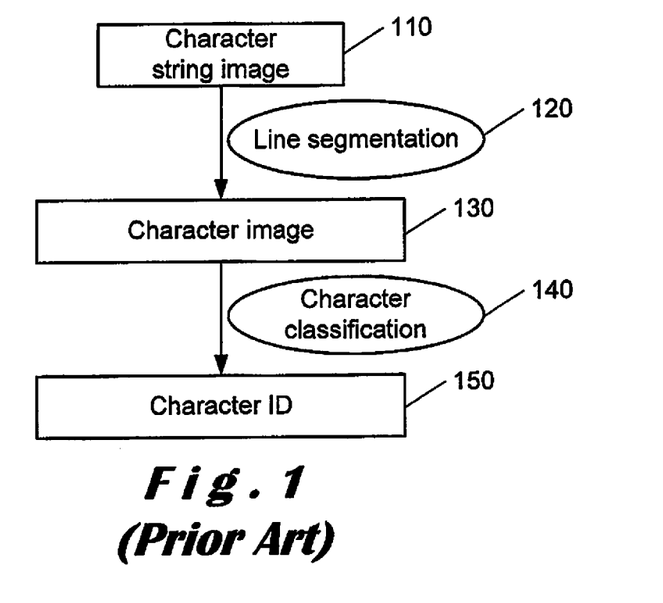
FIG. 1 shows the different steps in an Optical Character Recognition process according to the prior art.

Optical Character Recognition (OCR) systems are known. These systems automatically convert a paper document into a searchable text document. OCR systems are typically composed of three main steps: line segmentation, feature extraction and character classification. But, as illustrated in FIG. 1, feature extraction is often presented as part of the character classification. In that way, starting from an image of a character string, known optical character recognition systems are first applying a line segmentation to become images of individual characters and subsequently a character classification step is executed to identify the characters. While character classification techniques have become extremely robust over the past years, line segmentation remains still a critical step of OCR, in particular in the case of Asian text.

Different approaches of line segmentation exist (also often called character segmentation). The image representing a text line is decomposed into individual sub-images which constitute the character images. Different methods can be used to segment a line. A known line segmentation method is the detection of inter-character breaks or word breaks (adapted to Latin characters) as a way to isolate individual characters. This is described for example in WO2011128777 and WO201126755.

Another known line segmentation method, described for example in WO2011142977, uses chop lines which are processed afterwards to identify the lines that separate characters. Still other methods, such as for example in EP0138445B1, assume a constant pitch between characters.

Above described line segmentation methods are known as dissection methods. This type of method is less efficient for text composed of Asian text and Asian text combined with Latin text because in this type of text there is often no clear break or pitch between characters and Asian characters are not made of a single connected component but mostly of several connected components (e.g. radicals for Chinese characters).

Another type of method of line segmentation is based on the recognition of components in the image that match classes in a particular alphabet. Such methods require however long computation times.

Figure 2:
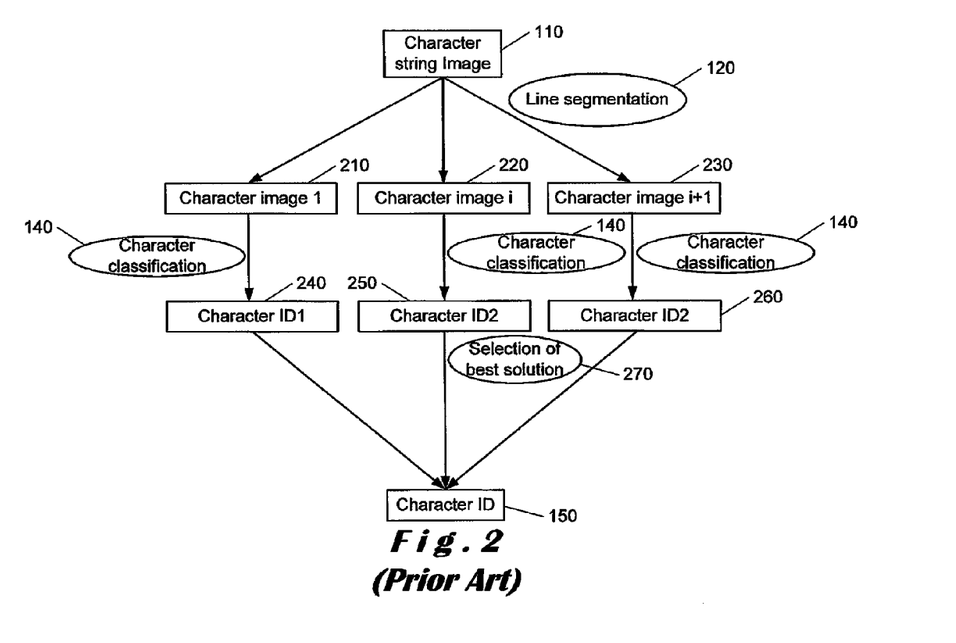
FIG. 2 illustrates a type of line segmentation in the state of the art known as oversegmentation.

A third type of segmentation technique uses a combination of the first two and is known as "oversegmentation" method. The image is oversegmented with different dissection methods as illustrated in FIG. 2. Several plausible segmentation solutions are analyzed by the same or different character classification methods and the best segmentation solution is then chosen. When the segmentation becomes difficult, as is the case for example for Asian characters, many possible segmentation solutions are evaluated which leads to extremely long computation times for analyzing the input string image.

DISCLOSURE OF THE INVENTION

It is an aim of the present invention to provide a method for segmenting characters in a character string image which provides fast and accurate segmentation of a line.

These aims are achieved according to the invention with a method for segmenting characters in a character string image showing the technical characteristics of the first independent claim. The method of segmenting characters in a character string image according to the invention comprises the steps of:
  a) determining a first starting point coordinate of a pixel contrasting to a background,
  b) generating a list of potential character widths dependent on a maximum character width and on characteristics of the portion of the character string image corresponding to the maximum character width,
  c) determining a second portion of the character string image corresponding to the first starting point coordinate and the first width,
  d) applying a classification method on the second portion of the character string image providing a likelihood of error for the first width and a candidate character,
  e) comparing the likelihood of error with a first threshold determined by a trade-off between speed and accuracy; and
  f) selecting the candidate character as the character corresponding to the first width if the likelihood of error corresponding to the first width is lower than the threshold value.

An advantage of this method is that line segmentation and character classification are made a combined process character by character. This creates a huge advantage in reduced calculation time because the required number of steps to execute line segmentation and character classification of a character string image is seriously reduced. The result is an increase of the speed and the accuracy of the method.

In other embodiments according to the present invention, the method further comprises the step of comparing the likelihood of error with a second threshold value higher than the first threshold value; and wherein the step of comparing the likelihood of error with the first threshold value is only executed if the likelihood of error is lower than the second threshold value.

The second threshold value has the advantage that it allows for fast filtering of candidates which have no chance of giving a positive result.

In another embodiment according to the present invention, the method further comprises the step of calculating the starting point for the next character if the likelihood of error corresponding to the first width is lower than the second threshold value, and keeping the calculated starting point of the next character in memory.

In another embodiment according to the present invention, the method further comprises the step of updating character statistics values contained in a database if the likelihood of error corresponding to the first width is lower than the first threshold value.

This database contains information on the maximal and average sizes of characters in the text and reference characters. These values are used when estimating the widths of the characters in the generation of the list of potential character widths in order to improve the speed and accuracy of the method.

In another embodiment according to the current invention, the list of potential character widths are sorted from most likely to less likely, wherein the most likely width is such that it is the widest width containing a maximum number of connected components which are not larger than an estimated maximum width for a character stored in the database.

In another embodiment according to the current invention, the two less likely widths of the list of potential character widths are an average global width and half of the average global width, wherein the average global width is the height of the character string image for a first character in the character string image and the average global width is calculated based on a previous average global width and an average character width stored in the database for a subsequent character in the character string image.

The advantage of this is that the average global width will identify Asian characters, while half of the average global width will identify Latin characters because the size of Asian characters is around twice the size of Latin characters and therefore the line segmentation method can by this means be applied to Latin characters, Asian characters and a combination thereof.

In another embodiment according to the current invention, if the likelihood of error corresponding to the previous width of the list of potential character widths is higher than the second threshold value, the method further comprises the steps of:

a) determining a second portion of the character string image corresponding to the starting point coordinate and to the next width of the list;
b) applying a classification method on the second portion of the character string image providing a likelihood of error for this width and a candidate character;
c) comparing the likelihood of error with the threshold value stored in the database;
d) repeating steps a), b) and c) until the likelihood of error corresponding to this width is lower than the threshold value or until all the widths contained in the list of potential character widths have been processed;
e) selecting the character candidate as the character corresponding to the width if the likelihood of error corresponding to the width is lower than the first threshold value.

Line segmentation and character classification are combined and performed one after the other as long as no solution has been found, and until a solution is found. This allows to reduce the number of steps required to perform such a method and also improves the accuracy of the method.

In another embodiment according to the current invention, the character string image is a vertical character string image and all widths are heights.

Asian characters can be written in lines but also in columns. The method is certainly not limited to lines and can easily be adapted to lines just by changing the widths of the characters into height and vice versa.

In another embodiment, the method further comprises the step of updating a character statistics database with the average global width value at a successful iteration.

In another embodiment according to the current invention, the step of generating a list of potential character widths is based on data retrieved from a database which contains reference characters for a given point size, the width of the biggest reference characters, the average width of the reference characters and the size of the average space between reference characters.

In another embodiment of the current invention; the database further contains estimates of statistical values of the characters, wherein the database is updated at each successful iteration.

In another embodiment of the current invention, the maximum character width is a maximum character width for Asian characters.

In another embodiment of the current invention, a computer program product comprising a computer usable medium having control logic stored therein for causing a computing device to segment a character string image in an input image, the control log comprising:

a) first control readable program code means for determining a first starting point coordinate of a pixel contrasting to a background,
b) second control readable program code means for generating a list of potential character widths dependent on a maximum character width and on characteristics of the portion of the character string image corresponding to the maximum character width,
c) third control readable program code means for determining a second portion of the character string image corresponding to the first starting point coordinate and the first width on the list of potential character widths,
d) fourth control readable program code means for applying a classification method on the second portion of the character string image providing a likelihood of error for the first width and a candidate character,
e) fifth control readable program code means for comparing the likelihood of error with a first threshold determined by a trade-off between speed and accuracy; and
f) sixth control readable program code means for selecting the candidate character as the character corresponding to the first width if the likelihood of error corresponding to the first width is lower than the threshold value.

BRIEF DESCRIPTION OF THE DRAWINGS

The invention will be further elucidated by means of the following description and the appended figures.

MODES FOR CARRYING OUT THE INVENTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

Furthermore, the various embodiments, although referred to as "preferred" are to be construed as exemplary manners in which the invention may be implemented rather than as limiting the scope of the invention.

The term "comprising", used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B, rather with respect to the present invention, the only enumerated components of the device are A and B, and further the claim should be interpreted as including equivalents of those components.

Figure 3:
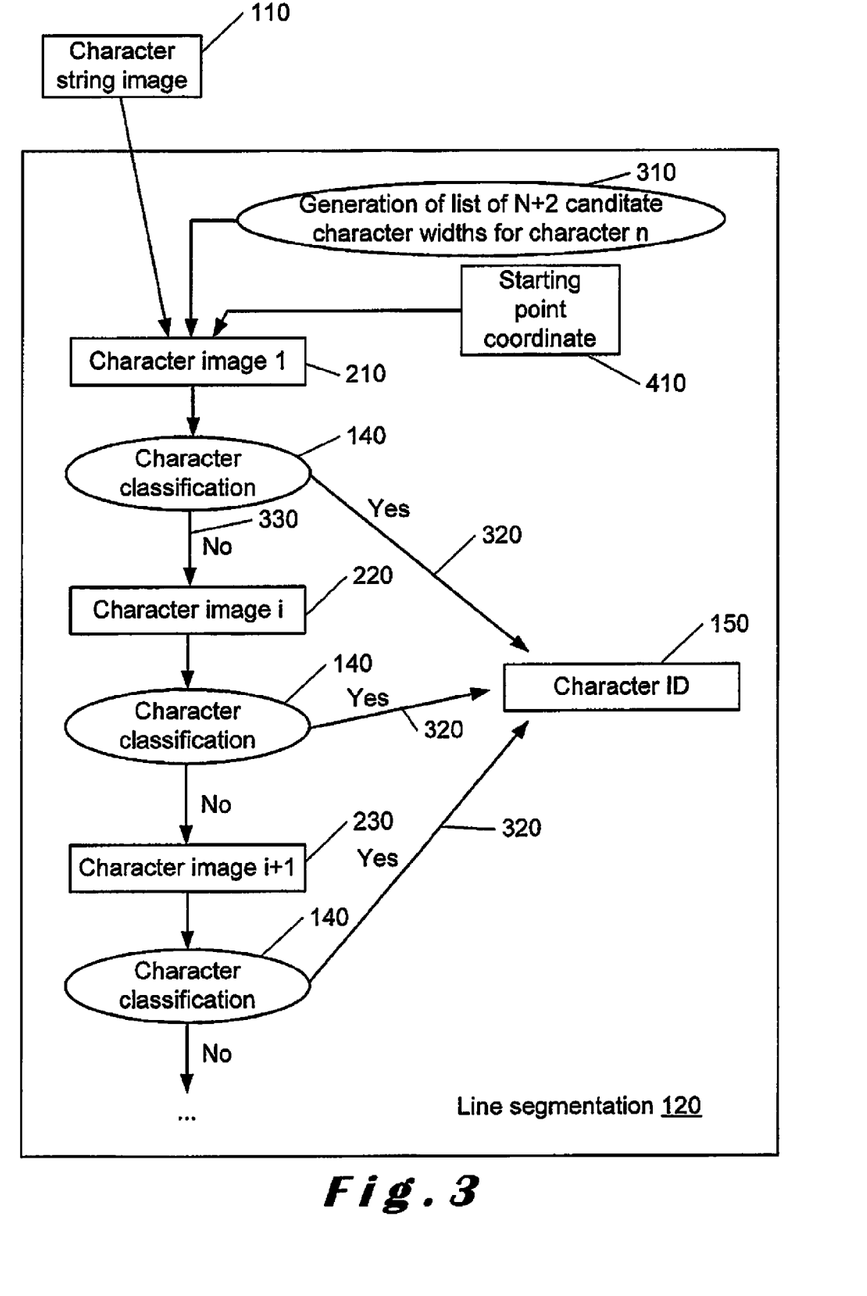
FIG. 3 shows a line segmentation method according to an embodiment of the invention.

Referring to FIG. 3, FIG. 3 illustrates a flow diagram of an optical character recognition (OCR) method according to an embodiment of the present invention. The input of the method is a character string image 110. In a first step, line segmentation 120 is performed on the character string image 110. Preliminary information on the potential widths of the character analyzed is calculated. This preliminary information on the potential widths of the character allows for a new sequence of steps which improves the speed of the OCR method. Although oversegmentation is still used, not all potential solutions (210, 220, 230) need to be analyzed systematically by the OCR method. The potential solutions are generated by means of a list of candidate character widths 310 and are sorted from most likely to less likely. The OCR method first analyzes the most likely potential solution 210. If a condition on the measurement error is satisfied 320, the character is classified 150, the other potential solutions are discarded and the next character is analyzed. If the condition on the measurement error is not satisfied 330, the next most likely potential solution is analyzed 220. This process is iteratively repeated as long as no character has been successfully classified or until all potential solutions have been evaluated.

The method, as described here, is applied to segment a line of text. However, the same method can be used to segment a column of text as is often the case for Asian text.

As described above, a list of candidate character widths 310, ordered from most likely to less likely to occur, is generated before the analysis of a character image. The generation of this list of candidate character widths will be described later on in the application. The list contains N+2 candidate widths wherein the N first widths are widths for which no cut is to be performed in the character string image 110 to extract a character and the last two widths are widths for which a cut needs to be performed in order to isolate and extract a character in the character string image 110.

Starting points are x coordinates which define the position of the new character image to analyse. A list of initial starting points is created at the beginning of the algorithm, where the first initial starting point of the list corresponds to the first black pixel in the left of the image. Other pre-defined starting points correspond to the end of the line, or the most right pixel. Other starting points are added to the list of starting points during the OCR process. The method ensures that all starting points present in the list are processed.

A character image is entirely defined by a starting point coordinate and a width brought into relation with a list of connected components. The height of the line is the same for all characters. At the end of the OCR process, the character is classified.

Once a potential solution is created, a character classification method 140 is applied to the potential solution to determine if a character can be classified for this potential solution.

In an embodiment of the invention, the character classification method 140 is based on Gabor functions.

A character classification method 140, according to an embodiment of the invention, requires two inputs:
  the starting point coordinate of character n, $SP_n$. The starting point coordinate is the (x) coordinate of the first pixel of a character at the bottom left of the character to analyze,
  a candidate width $w_i$ taken from the list of candidate character widths for character n.

The output is a likelihood of error $P_{err}$ which is used to compute the character $C_n$. The likelihood of error $P_{err}$ is compared with two threshold parameters: a threshold to have a low likelihood of error $Tl_{err}$ and a threshold to have a high likelihood of error $Th_{err}$. The values of $Tl_{err}$ and $Th_{err}$ can be adjusted depending on the speed versus accuracy requirements. In a preferred embodiment of the invention, the values of $Tl_{err}$ and $Th_{err}$ are set to $Tl_{err}$=20% and $Th_{err}$=99.9%. The threshold to have a low likelihood of error $Tl_{err}$ defines the condition to have a successfully classified character.

Figure 4:
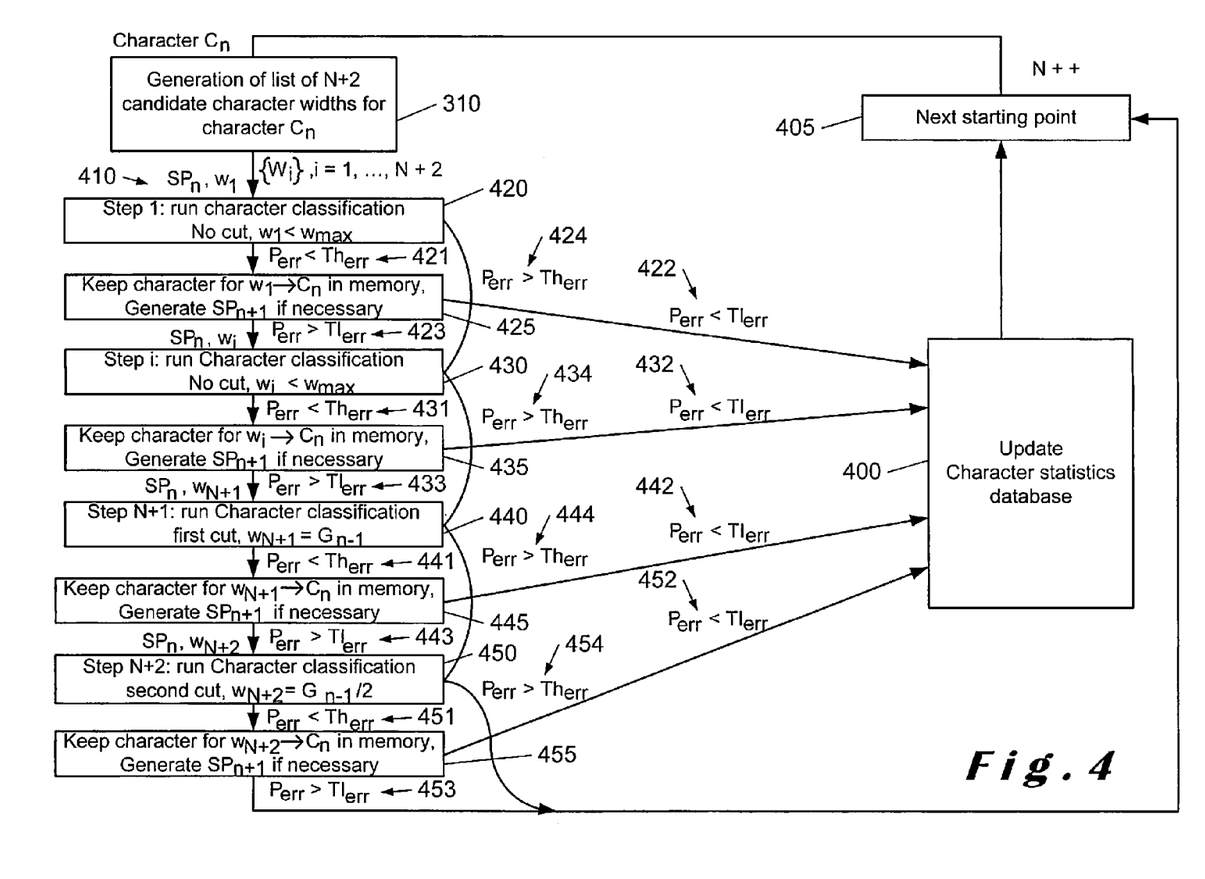
FIG. 4 illustrates a line segmentation method with a character statistics database.

A line segmentation method according to an embodiment of the invention uses a character statistics database 400 as illustrated in FIG. 4. The elements of the database will now be listed. A more detailed description on how each of the elements are used will follow further on in the application. The database contains:
  a library of reference sizes (height and width) for Asian and Latin characters, and for a selected point size, stored in memory,
  the reference maximal size for Asian and Latin characters for the selected point size, stored in memory, respectively $w_{Max,A,r}$ and $w_{Max,L,r}$,
  the reference mean inter-character space, same for Asian and Latin text, for the selected point size, $s_r$,
  the estimated maximum width of Asian and Latin characters in the text being analyzed: respectively $w_{Max,A,t}$ and $w_{Max,L,t}$,
  the mean inter-character space for Asian or Latin characters in the text being analyzed, $s_t$,
  the local estimate of the width of Asian and Latin character n, respectively $L_{n,A}$ and $L_{n,L}$, which represents the width of the corresponding reference character, calculated only for characters which have been classified. It is a measurement of the point size of the character computed using the actual width and value of character n.
  the global estimate of the width of characters, $G_n$, which represents the width of the corresponding reference character, calculated only for characters which have been classified. The value of $G_n$ is a running average of the previously measured local estimates $L_n$ and is therefore a more accurate measurement of the average character point size. This value is more reliable because it is more tolerant to characters wrongly classified.

Referring to FIG. 4, FIG. 4 shows a flow diagram of the line segmentation process according to an embodiment of the invention. The process is illustrated for a segmentation of character $C_n$. The list 310 of all N+2 candidate character widths for character $C_n$ is generated and a first candidate character width $w_1$ is taken from the list of candidate character widths. These two values, $SP_n$ and $w_1$, are the inputs 410 for the character classification method 140 in step 420. The output of step 420 is the likelihood of error $P_{err}$.

Depending on the value of $P_{err}$, two options are possible. If the likelihood of error $P_{err}$ is lower than the threshold on the error to have a high likelihood of error $Th_{err}$ 421, the character $C_n$ is a potential solution. The character $C_n$ corresponding to the first candidate width $w_1$, is then kept in memory and the starting point of the next character is calculated and added to the list of starting points to be processed if needed: $SP_{n+1}=SP_n+w_1+s_{A,t}$, 425. If further the likelihood of error $P_{err}$ is also lower than the threshold on the error to have a low likelihood of error $Tl_{err}$ 422, the character $C_n$ can be considered as successfully classified and the character statistics database 400 is updated as explained later on in the description. The method can move to the next starting point $SP_{n+1}$ 405 to determine the next character $C_{n+1}$ without processing the other widths for the current starting point $SP_n$. If the likelihood of error $P_{err}$ is higher than the threshold on the error to have a low likelihood of error $Tl_{err}$ 423, the character classification method is executed with the next candidate width i, $w_i$ 430, as described hereunder.

If however the likelihood of error $P_{err}$ is higher than the threshold on the error to have a high likelihood of error $Th_{err}$ 424, the character $C_n$ corresponding to the candidate width 1, $w_1$, is not kept in memory and no new starting point is calculated.

The character classification method is executed with the next candidate width i, $w_i$ 430. Again, there are two options depending on the value of $P_{err}$. If $P_{err}$ is lower than $Th_{err}$ 431, the character $C_n$ is memorized with the width $w_i$, the starting point of the next character is calculated and added to the list of starting points to be processed if needed 405 and if $P_{err}$ is also lower than $Tl_{err}$ 432 the character statistics database is updated 400. If $P_{err}$ is however higher than $Tl_{err}$ and/or $Th_{err}$ (435, 433), the character classification method is executed with the next candidate width i+1, $w_{i+1}$ until all the widths of the list have been processed (i=N) or until a character has been successfully classified ($P_{err}<Tl_{err}$).

For i=N+1, the same process is repeated but now the width $w_{N+1}$ is such that a first cut is performed for the width value $w_{N+1}=w_{Max,A,t}$ 440. If no character has been classified with a low probability of error (443 or 445) $P_{err}<Tl_{err}$ for i=N+1 then the process is repeated for i=N+2 where $w_{N+2}=w_{Max,L,t}$ 450 and again different paths are possible such as 451 with 452, 451 with 453 or 454.

So as not to analyze all solutions of the oversegmentation, the list of all N+2 candidate widths $\{w_i\}$ for character n ($C_n$) is generated as follows: the candidate widths are sorted from most likely to less likely and the number of candidate widths varies from character to character, depending on the geometry of the potential character measured with the number of connected components. It is assumed, based on observations, that the width of Asian characters is common for most characters, except for a few characters which have then a smaller width. According to an embodiment of the present invention, the most likely width corresponds to that which contains the biggest set of connected component, not wider than the estimated width of the wider Asian character ($w_{Max,A,t}$) plus the estimated average space between characters ($s_t$).

Characters can be non-touching, or touching. Non-touching characters have a higher probability to occur and are therefore to be taken into account first.

For non-touching characters, (no cut is necessary), the candidate width with index i ($w_i$), calculated in pixels, is such that it is the $i^{th}$ biggest width with a set of p (p≥0) connected components smaller than the widest Asian character ($w_{Max,A,t}$) plus the average estimate space between characters ($s_t$). Width $w_i$ has p connected components, width $w_{i+1}$ has p or less connected components and is such that $w_{i+1} \le w_i$.

The widest Asian character ($w_{Max,A,t}$) and the estimate space between characters ($s_t$) are evaluated in the character statistics database. There are N possible non-touching characters.

Cuts need to be performed if two adjacent characters are touching, the characters will be cut at the most likely place which is calculated from the average global width $G_{n-1}$ of the character which can be found in the character statistics database updated at the previous iteration (n-1) for character $C_n$. The width with index N+1, $w_{N+1}$, corresponds to the sum of the average global width of Asian characters $G_{n-1}$ and the average space $s_t$. The width with index N+2, $w_{N+2}$ corresponds to the sum of the average width of Latin characters $G_{n-1}/2$ and the average space $s_t$. It is assumed that the width of Latin characters is half of the width of Asian characters.

To summarize, at each iteration the list of input candidate widths of character n is given by:

$w_i$=width of the $i^{th}$ biggest set of p connected components such that $w_i=w_{Max}+s_t$, i=1, ..., N; N≥0

$$w_{N+1}=G_{n-1}+s_t,$$

$$w_{N+2}=G_{n-1}/2+s_t$$

where $w_{Max,A,t}$, $G_{n-1}$, $s_t$, $s_t$ are values which come from the character statistics database updated each time a character has been classified (or $P_{err}<Tl_{err}$).

The database contains a data structure which stores the character information extracted from the lines and a library of reference characters as well as statistical values on these characters. The single data structure is created at the beginning of the process, the structure is then empty. The data structure, stored in memory is updated at each iteration and its structure is similar to a graph.

All the parameters of the database are summarized in the following table:

TABLE 1

| parameters of the characters statistics database | | | |
|---|---|---|---|
| | Individual Characters | Max | Mean |
| Reference | $w_{A,r}$, $w_{i,r}$ (stored in library, for each character of a selected point size) | $w_{Max,A,r}$, $w_{Max,L,r}$ | $w_{mean,A,r}$, $w_{mean,L,r}$ $s_T$ |
| Text | $w_i$ | $w_{Max,A,t}$, $w_{Max,L,t}$ | $L_{n,A}$, $L_{n,L}=$ $L_{n,A}/2$ $G_{n,A}$, $G_{n,L}=$ $G_{n,A}/2$ $s_t$ | and the evaluation of the different parameters of the database is now explained.

The width of the biggest Asian and Latin character is evaluated as follows:

$$w_{Max,A,t} = w_{Max,A,r} \times \frac{w_i}{w_{A,r}},$$

$$w_{Max,L,t} = w_{Max,L,r} \times \frac{w_i}{w_{L,r}},$$

where the proportionality ratio represents a conversion of the point size of the characters in the library to the point size of the characters in the text.

The same is done for the average size of Asian and Latin characters, respectively:

$$L_{n,A} = w_{mean,A,r} \times \frac{w_i}{w_{A,r}},$$

$$L_{n,L} = w_{mean,L,r} \times \frac{w_i}{w_{L,r}}.$$

This value represents the local estimate of the width of character n and is further used to evaluate the global estimate of the width of characters at the step n.

The global estimate of the width of characters at step n, $G_n$ is calculated using the following equation:

$$G_n = \frac{G_{n-1} * (n-1) + L_n}{n}$$

$G_0$=height of line
where $G_{n-1}$ is the global estimate of the average width of characters updated at step n−1, $L_n$ is the local estimate of the average size of characters at step n, n is the index of the current step of the method and $G_0$ is the height of the line (Asian characters are assumed square). This equation is valid for Asian and Latin characters. It is assumed that for Latin characters, the global estimate of the width is half of the global estimate of Asian characters.

Finally, the same proportionality is applied to estimate the inter character space in the text $s_t$, when the point size of the text is different from the point size of the reference characters:

$$s_t = s_r \times \frac{G_{n,A}}{w_{mean,A,r}}.$$

This embodiment illustrates the case of a line segmentation method but the method is not limited to a line. Asian text can also be written in columns and the same method can also be used. In this case, the width of the character has to be replaced by the height of the character, and the starting point coordinate is the (y) coordinate of the first pixel of a character at the top of the character string image.

The invention claimed is:

1. A method for segmenting characters in a character string image,
the method comprising the steps of
determining a first starting point coordinate of a pixel contrasting to a background,
generating a list of potential character widths dependent on a maximum character width and on characteristics of the portion of the character string image corresponding to the maximum character width,
determining a second portion of the character string image corresponding to the first starting point coordinate and the first width on the list of potential character widths,
applying a classification method on the second portion of the character string image providing a likelihood of error for the first width and a candidate character,
comparing the likelihood of error with a first threshold determined by a trade-off between speed and accuracy; and
selecting the candidate character as the character corresponding to the first width if the likelihood of error corresponding to the first width is lower than the threshold value.

2. The method according to claim 1, further comprising the step of
comparing the likelihood of error with a second threshold value higher than the first threshold value; and
wherein the step of comparing the likelihood of error with the first threshold value is only executed if the likelihood of error is lower than the second threshold value.

3. The method according to claim 1, further comprising the step of
calculating the starting point for the next character if the likelihood of error corresponding to the first width is lower than the second threshold value, and
keeping the calculated starting point of the next character in memory.

4. The method according to claim 1, further comprising the step of
updating character statistics values contained in a database if the likelihood of error corresponding to the first width is lower than the first threshold value.

5. The method according to claim 1, wherein the list of potential character widths are sorted from most likely to less likely,
wherein the most likely width is such that it is the widest width containing a maximum number of connected components which are not larger than an estimated maximum width for a character.

6. The method according to claim 5, wherein the two less likely widths of the list of potential character widths are an average global width and half of the average global width, wherein the average global width is the height of the character string image for a first character in the character string image and the average global width is calculated based on a previous average global width and an average character width for a subsequent character in the character string image.

7. The method according to claim 1, wherein, if the likelihood of error corresponding to the first width of the list of potential character widths is higher than the second threshold value, the method further comprises the steps of:
a) determining a third portion of the character string image corresponding to the starting point coordinate and to the next width on the list of potential character widths;
b) applying a classification method on the third portion of the character string image providing a likelihood of error for this next width and a next candidate character;
c) comparing the likelihood of error for the next width with the first threshold value;
d) repeating steps a), b) and c) until the likelihood of error corresponding to a width is lower than the threshold value or until all the widths contained in the list of potential character widths have been processed;
e) selecting the character candidate as the character corresponding to the width if the likelihood of error corresponding to the width is lower than the first threshold value.

8. The method according to claim 1, wherein the character string image is a vertical character string image and all widths are heights.

9. The method according to claim 6, further comprising the step of updating a character statistics database with the average global width value at a successful iteration.

10. The method according to claim 1, wherein the step of generating a list of potential character widths is based on data retrieved from a database which contains reference characters for a given point size, the width of the biggest reference characters, the average width of the reference characters and the size of the average space between reference characters.

11. The method according to claim 10, wherein the database further contains estimates of statistical values of the characters.

12. The method according to claim 11, wherein the database is updated at a successful iteration.

13. The method according to claim 1, wherein the maximum character width is a maximum character width for Asian characters.

14. A computer program product comprising a non transitory computer usable medium having control logic stored therein for causing a computing device to segment a character string image in an input image, the control logic comprising:
 a) first control readable program code means for determining a first starting point coordinate of a pixel contrasting to a background,
 b) second control readable program code means for generating a list of potential character widths dependent on a maximum character width and on characteristics of the portion of the character string image corresponding to the maximum character width,
 c) third control readable program code means for determining a second portion of the character string image corresponding to the first starting point coordinate and the first width on the list of potential character widths,
 d) fourth control readable program code means for applying a classification method on the second portion of the character string image providing a likelihood of error for the first width and a candidate character,
 e) fifth control readable program code means for comparing the likelihood of error with a first threshold determined by a trade-off between speed and accuracy; and
 f) sixth control readable program code means for selecting the candidate character as the character corresponding to the first width if the likelihood of error corresponding to the first width is lower than the threshold value.

\* \* \* \* \*